United States Patent
Prager et al.

(10) Patent No.: US 8,180,757 B2
(45) Date of Patent: May 15, 2012

(54) SYSTEM AND METHOD FOR LEVERAGING TAG CONTEXT

(75) Inventors: Scott H. Prager, Stratham, NH (US);
Martin T. Moore, Somerville, MA (US);
Miguel A. Estrada, Hollis, NH (US);
Christoph Josef Luecking, Brakel (DE)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/966,220

(22) Filed: Dec. 28, 2007

(65) Prior Publication Data

US 2009/0171898 A1    Jul. 2, 2009

(51) Int. Cl.
*G06F 7/00* (2006.01)

(52) U.S. Cl. ......... 707/707; 707/722; 707/736; 707/769

(58) Field of Classification Search ................. 707/3, 4, 707/7, 999.003, 999.004, 999.007, 706, 723, 707/731, 732, 748, 707, 722, 736, 769; 717/110
See application file for complete search history.

(56) References Cited

U.S. PATENT DOCUMENTS

| | | | |
|---|---|---|---|
| 7,058,624 B2 * | 6/2006 | Masters | 707/3 |
| 2002/0198875 A1 * | 12/2002 | Masters | 707/4 |
| 2004/0123242 A1 * | 6/2004 | McKibben et al. | 715/513 |
| 2007/0244892 A1 * | 10/2007 | Narancic | 707/7 |
| 2007/0250810 A1 * | 10/2007 | Tittizer et al. | 717/110 |
| 2008/0016072 A1 * | 1/2008 | Frieden et al. | 707/7 |
| 2008/0040362 A1 * | 2/2008 | Aucouturier et al. | 707/100 |
| 2008/0059989 A1 * | 3/2008 | O'Connor et al. | 725/9 |
| 2008/0235194 A1 * | 9/2008 | Shima et al. | 707/3 |

* cited by examiner

*Primary Examiner* — Dennis Truong
(74) *Attorney, Agent, or Firm* — Holland & Knight LLP; Brian J. Colandreo, Esq.; V. Raman Bharatula, Esq.

(57) ABSTRACT

A method and computer program product for leveraging the creation context of a tag includes creating one or more tags, each of the one or more tags associated with a respective piece of content. A creation context is associated with each of the one or more tags. The one or more tags are searched based upon, at least in part, the creation context.

20 Claims, 10 Drawing Sheets

SYSTEM AND METHOD FOR LEVERAGING TAG CONTEXT

TECHNICAL FIELD

This disclosure relates to sharing information and, more particularly, to systems and methods for tagging pieces of content and using the creating context of the tag.

BACKGROUND

The vast wealth of electronic content available provides consumers with an astounding amount of available information. However, the great quantity of available information presents challenges in locating particular information that is of interest to a given person at a given time. While various search engines and cataloging systems facilitate finding desired information, unfortunately such search engines and cataloging systems typically base search results upon embedded metadata, text analytics, and the like. As such, while search results from search engines and cataloging systems may relate to the searched topic, the relevance to a person's particular interest may be lacking.

One attempt to improve the ability to identify and retrieve electronic content is the use of tags. Tags are generally a keyword used to describe or categorize a piece of content, such as a picture, webpage, electronic document, or the like. Tags represent an improvement over typical searching mechanisms in that the tag associated with a piece of content may be more focused or more relevant to the major and/or important aspects of the content. There are different types of tags, such as tags assigned by contributors or readers of data or content, sometimes the tags are 'suggested' by text analytics, and sometimes the tags are created via automated processes. The sources of these tags, can have distinct implications on results of searches conducted using tags. Current systems do not distinguish between tags created from different sources. By not distinguishing, the important implications to users and to search and analysis software are missed.

SUMMARY OF DISCLOSURE

In a first implementation, a method includes creating one or more tags, each of the one or more tags associated with a respective piece of content. The method further includes associating a creation context with each of the one or more tags. The one or more tags are searched based upon, at least in part, the creation context.

One or more of the following features may be included. The creation context may include a computing environment used to create the one or more tags. Additionally/alternatively, the creation context may include a method used to create the one or more tags. The method used to create the one or more tags may include automatic tag creation, semi-automatic tag creation, and/or manual tag creation.

Searching the one or more tags may include defining a weighting factor for each of a plurality of creation contexts. Defining a weighting factor for each of a plurality of creation contexts may include defining a weighting factor by a user. Further, searching the one or more tags may include prioritizing a result set of a search based upon, at least in part, the weighting factor. Additionally/alternatively, searching the one or more tags may include filtering a result set of a search based upon, at least in part, the creation context.

According to another implementation, a computer program product residing on a computer readable medium having a plurality of instructions stored thereon. When executed by a processor, the instructions cause the processor to perform operations including creating one or more tags, each of the one or more tags associated with a respective piece of content. A creation context is associated with each of the one or more tags. The one or more tags are searched based upon, at least in part, the creation context.

One or more of the following features may be included. The creation context may include a computing environment used to create the one or more tags. Additionally/alternatively, the creation context may include a method used to create the one or more tags. The method used to create the one or more tags may include automatic tag creation, semi-automatic tag creation, and/or manual tag creation.

The instructions for searching the one or more tags include instructions for defining a weighting factor for each of a plurality of creation contexts. The instructions for defining a weighting factor for each of a plurality of creation contexts may include instructions for defining a weighting factor by a user. Additionally/alternatively, the instructions for searching the one or more tags may include instructions for prioritizing a result set of a search based upon, at least in part, the weighting factor. Further, the instructions for searching the one or more tags may include instructions for filtering a result set of a search based upon, at least in part, the creation context.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
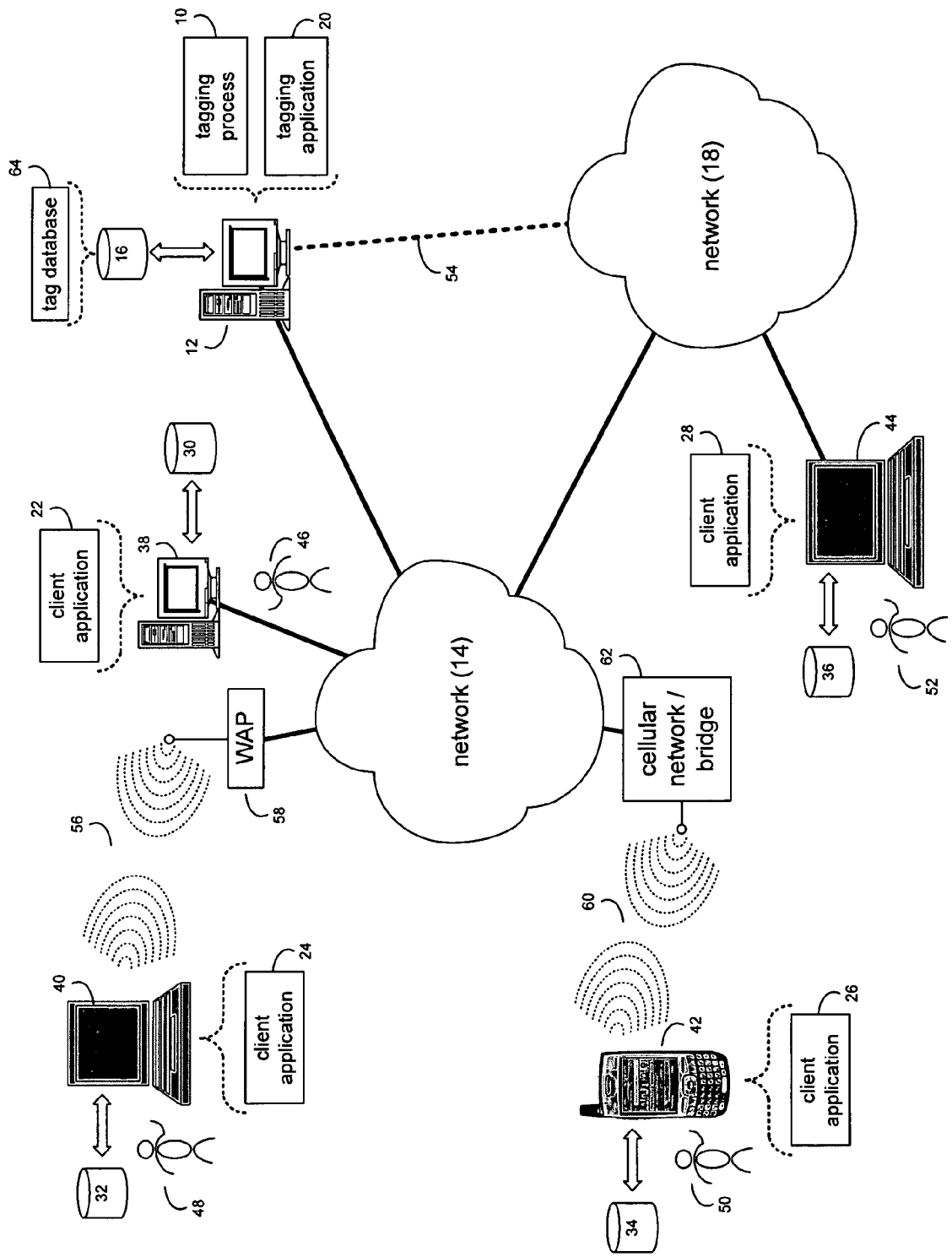
FIG. 1 is a diagrammatic view of tagging process, and a tagging application coupled to a distributed computing network.

System Overview:

Referring to FIG. 1, there is shown tagging process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. In addition/as an alternative, the tagging process may reside on and may be executed by one or more client electronic devices, such as personal computer, a notebook computer, a personal digital assistant, and a data enable cellular phone, for example.

As will be discussed below in greater detail, tagging process 10 may allow a user to create one or more tags, with each of the one or more tags being associated with a respective piece of content. Tagging process 10 may further associate a creation context with each of the one or more tags. A user may search the one or more tags based upon, at least in part, the creation context. As such, the creation context may be used as a component of a search for content that is carried out by searching tags that may be associated with the content.

The instruction sets and subroutines of tagging process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Various additional/alternative protocols and/or application servers may be used to allow access to server computer 12 via network 14. Network 14 may be connected to one or more secondary networks (e.g., network 18), examples of which may include but are not limited to: a local area network; a wide area network; or an intranet, for example.

Server computer 12 may execute tagging application 20, which may be included as a module or feature of social collaboration applications, examples of which may include but are not limited to Lotus Connections™ Server. Tagging application 20 may allow users to tag pieces of content (e.g., web pages, documents, pictures, videos, and the like) and/or search tags associated with pieces of content via client applications 22, 24, 26, 28, which may include a social collaboration application (e.g., Lotus Connections™), or various other applications which may include but are not limited to web browsers, communication applications (e.g., Lotus Notes™ and Microsoft Outlook™) Tagging process 10 may be a stand alone application that interfaces with tagging application 20 or an applet/application that is executed within tagging application 20.

The instruction sets and subroutines of tagging application 20, which may be stored on storage device 16 coupled to server computer 12 may be executed by one or more processors (not shown) and one or more memory architectures (not shown) incorporated into server computer 12.

As mentioned above, in addition/as an alternative to being a server-based application residing on server computer 12, the tagging process may be a client-side application (not shown) residing on a storage device (e.g., storage device 30, 32, 34, 36) coupled to one or more client electronic device 38, 40, 42, 44, respectively. As such, the tagging process may be a stand alone application that interfaces with a client application (e.g., client applications 22, 24, 26, 28), or may be an applet/application that is executed within a client application. As such, the tagging process may be a client-side process, a server-side process, or a hybrid client-side/server-side process, which may be executed, in whole or in part, by server computer 12 and/or one or more of client electronic device 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may access tagging application 20 and may allow users to e.g., create tags, and search and retrieve pieces of content based upon, at least in part, tags associated with the pieces of content.

Users 46, 48, 50, 52 may access tagging application 20 directly through the device on which the client application (e.g., client applications 22, 24, 26, 28) is executed, namely client electronic devices 38, 40, 42, 44, for example. Users 46, 48, 50, 52 may access tagging application 20 directly through network 14 or through secondary network 18. Further, server computer 12 (i.e., the computer that executes tagging application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
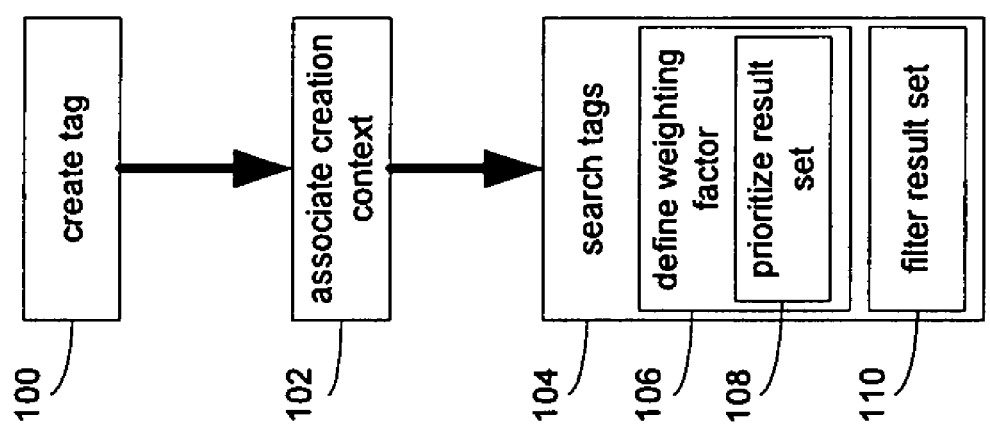
FIG. 2 is a diagrammatic flow chart of a process executed by one or more of the tagging process and the tagging application of FIG. 1.

The Tagging Process:

Referring also to FIG. 2, tagging process 10 may allow a user to create 100 one or more tags, in which each of the one or more tags are associated with a respective piece of content. Tagging process 10 may further associate 102 a creation context with each of the one or more tags. Tagging process 10 and/or tagging application 20 may allow a user to search 104 the one or more tags based upon, at least in part, the creation context.

Figure 3:
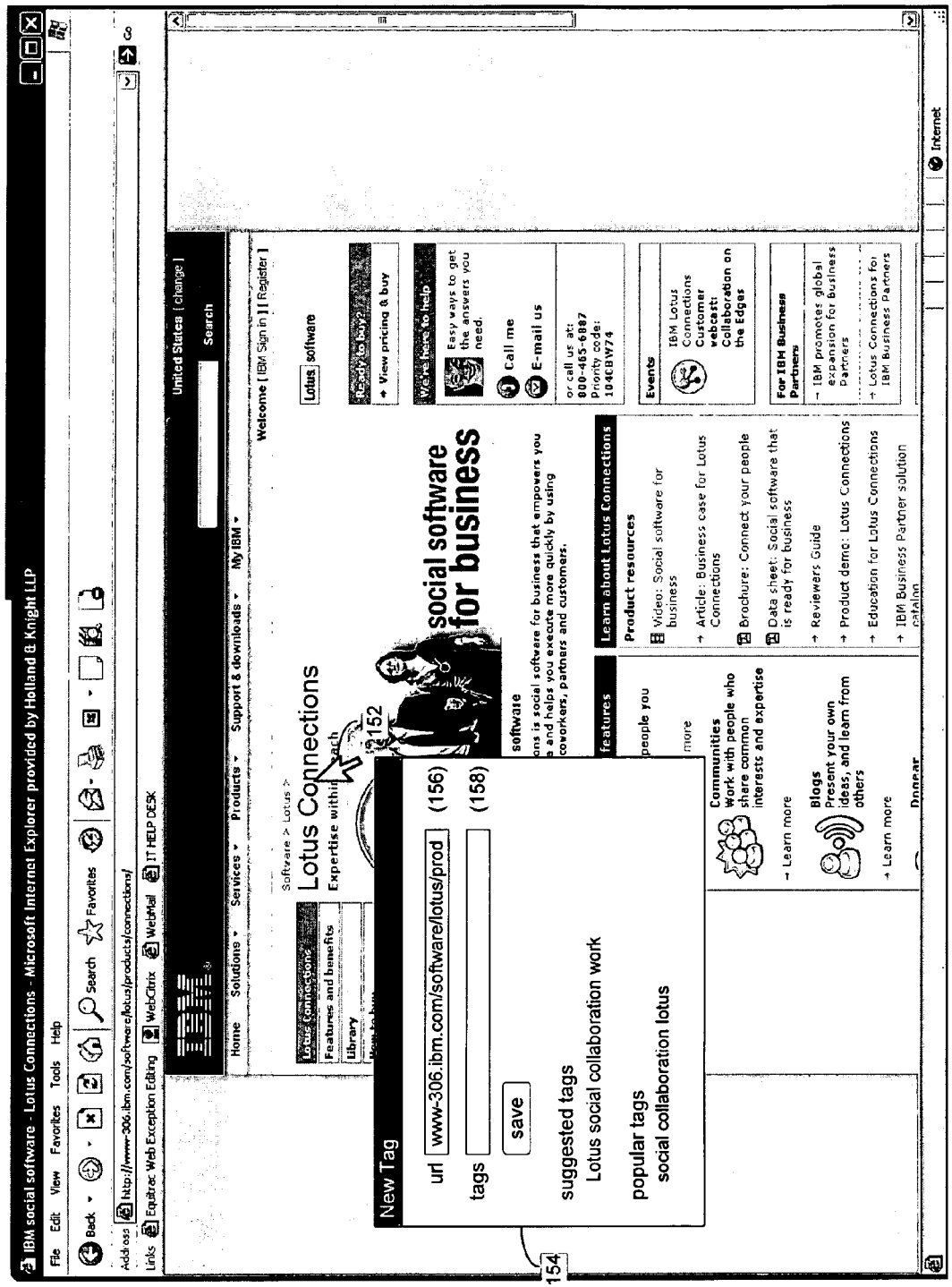
FIG. 3 is a diagrammatic view of a display screen rendered by a client application and/or the tagging process of FIG. 1.

For example, an referring also to FIG. 3, using client application 22 (e.g., a web browser) user 46 may access content (e.g., web page 150, a document library, a team space, or digital photographs, and the like). Tagging process 10 and/or tagging application 20 may allow user 46 to create 100 one or more tags associated with web page 150. The tag may generally be a word, phrase, or the like, associated with content, and may describe, categorize, etc., the content. For example, user 46 may position onscreen pointer 152 on web page 150 using a pointing device (e.g., a mouse; not shown) and may right-click on web page 150. Right-clicking on web page 150 may result in tagging process 10 and/or tagging application 20 rendering new tag window 154. New tag window 154 may include URL field 156, which may include the URL of web page 150. Additionally, new tag window 154 may include tag field 158, into which user 46 may enter (e.g., using a keyboard, not shown) a desired tag.

Tagging process 10 may associate 102 a creation context with each of the one or more tags user 46 may create 100. The creation context may include, for example, a computing environment used to create 100 the tag. The computing environment may include, for example, the application (e.g., client application 22) through which the tag was created. For example, but is not limited to, the application may include a web browser, email application (e.g., Lotus Notes™, Microsoft Outlook™), a collaboration application (e.g., Lotus Connections™) a document library application, or similar application. In each case, the application through which the tag was created 100 may provide contextual information (e.g., information about the piece of content with which the tag is associated). For example, a tag created through a web browser may suggest that the piece of content associated with the tag may be a web page. Similarly, a tag created through an email application may suggest that the piece of content with which the tag is associated may be an email or calendar item. Other contextual information may also be derived.

Similarly, the computing environment may include the device upon which the tag was created. For example, user 50 may create 100 a tag using personal digital assistant 42. Contextual information about the tag and/or the piece of content with which the tag is associated by be derived from the computing device (e.g., personal digital assistant 42) through which the tag was created 100.

Figure 4:
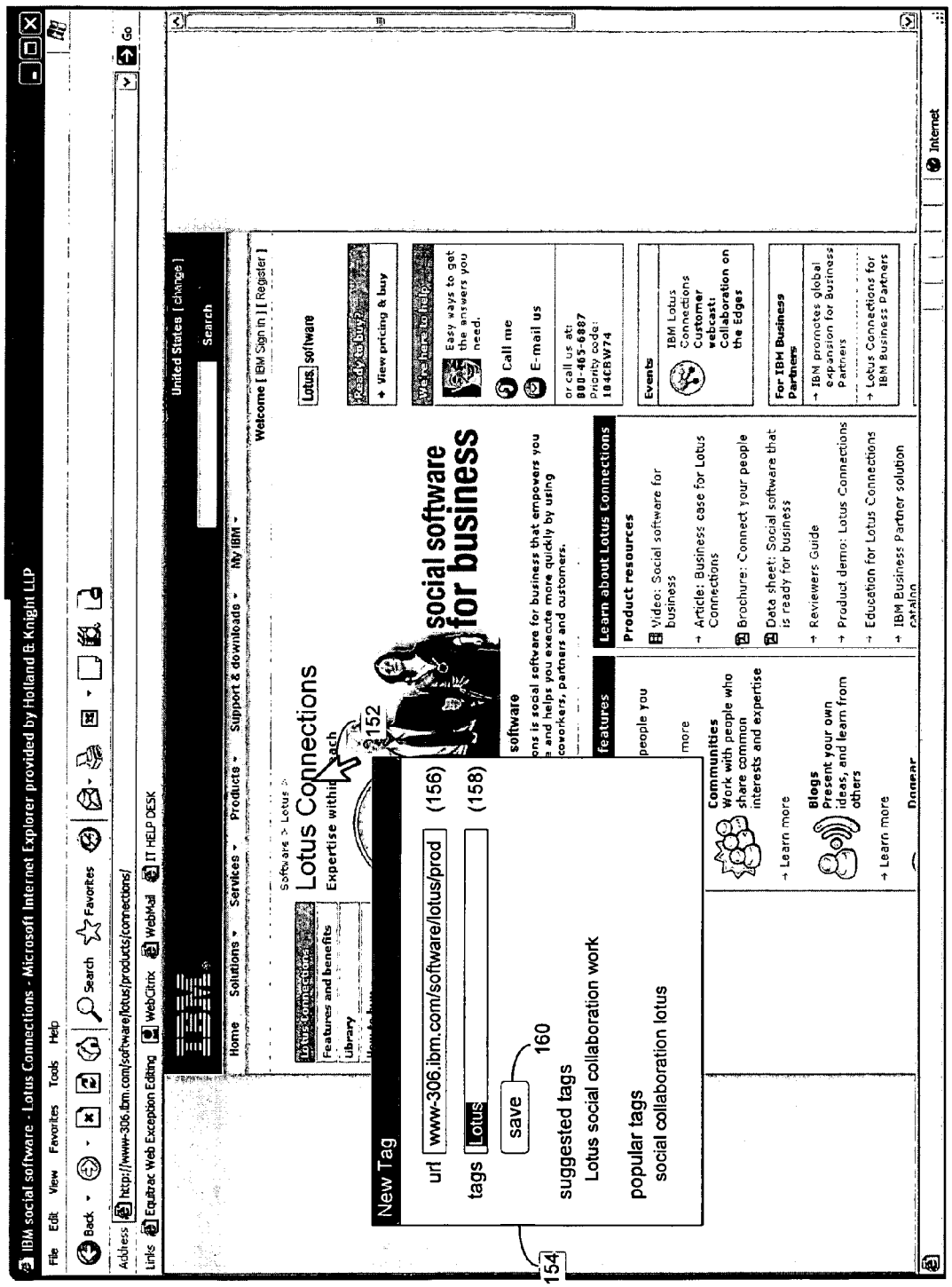
FIG. 4 is diagrammatic view of a display screen rendered by the client application and/or the tagging process of FIG. 1.

Additionally/alternatively, the creation context associated 102 with the tag may include the method used to create the tag. For example, and referring also to FIG. 4, when user 46 right-clicks on web page 150, resulting in tagging process 10 and/or tagging application 20 rendering new tag window 154, tagging application 20 may automatically create the tag "Lotus", displayed in tag field 158. Automatic tag creation, by tagging application 20, may be based upon, for example, metadata embedded in web page 150, text analysis, as well as similar techniques. Tagging process 10 may associate 102 the automatically tag creation method with that automatically generated tag "Lotus".

Further, the method used to create the tag may include semi-automatic tag creation. Semi-automatic tag creation may include one or more tags suggested (e.g., based upon, at least in part, embedded metadata, text analysis, and the like) by tag application 20, which may be selected by the user. For example, and continuing with the example of FIG. 4, tagging application 20 may suggest the tag "Lotus" displayed in tag field 158. However, the tag "Lotus" may not be automatically associated with web page 150. Creating 100 the tag "Lotus" associated with web page 150 may require user 46 to accept the suggested tag, e.g., by selecting via onscreen pointer 152 save button 160, pressing enter on a keyboard (not shown) or similar mechanism. Accepting the suggested tag may result in creating 100 the tag "Lotus" associated with web page 150, and may result in tagging process 10 associating 102 semi-automatic tag creation method with the tag "Lotus" as a creation context.

Figure 5:
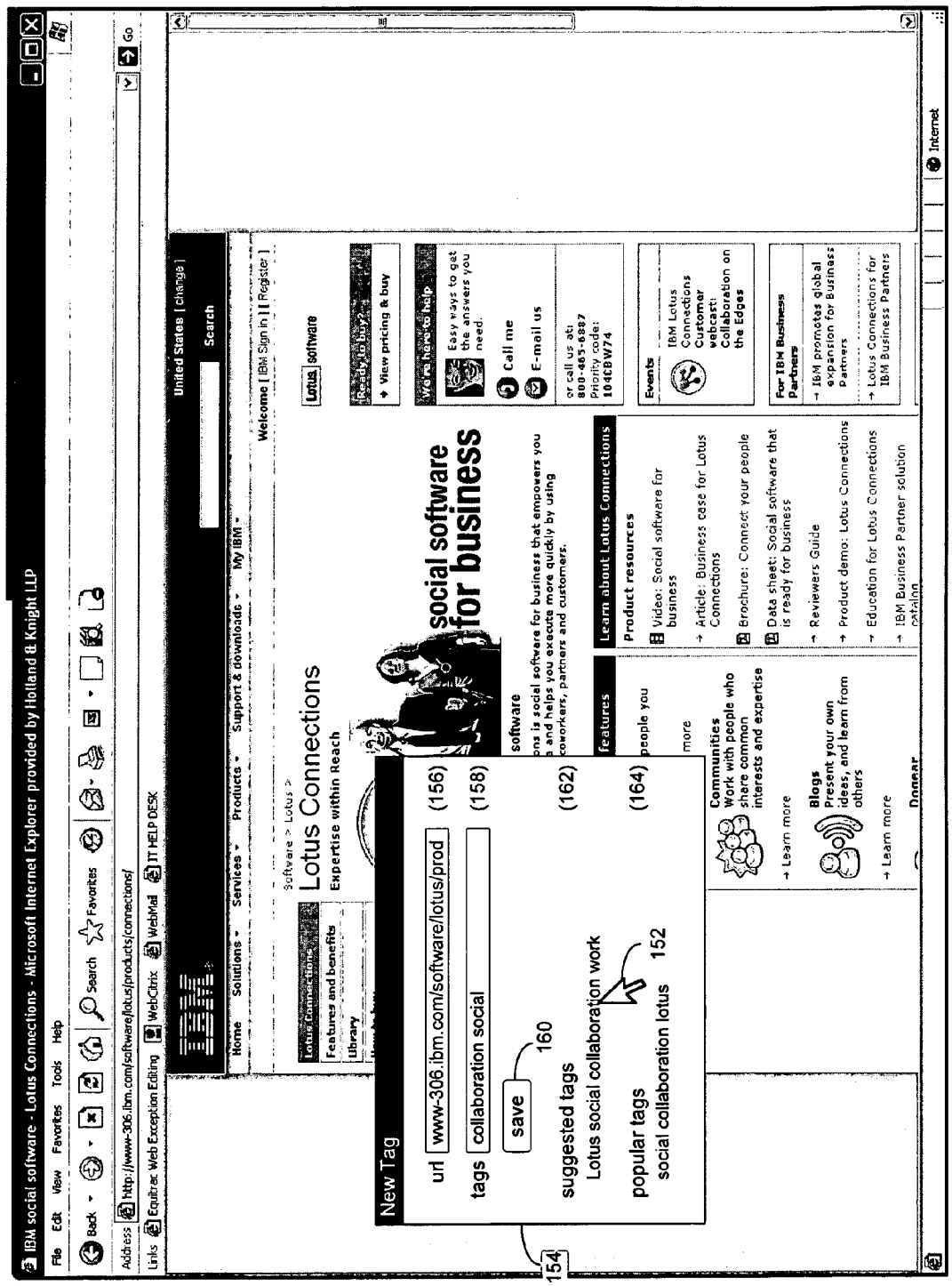
FIG. 5 is a diagrammatic view of a display screen rendered by the client application and/or the tagging process of FIG. 1.

Another example of a semi-automatic tag creation method may include selecting a tag from one or more lists of possible tags. For example, and referring also to FIG. 5, new tag window 154 may include suggested tags list 162, which may include one or more suggested tags, e.g., that may be based upon, at least in part, metadata embedded in web page 150, text analysis, and the like. Additionally, new tag window 154 may include popular tags list 164, e.g., which may include the most popular tags associated with web page 150 by other users (e.g., users 48, 50, 52) and/or the most popular tags associated with any content accessed by users of tagging application 20 (e.g., in the case of tagging application 20 being a collaborative and/or multi-user tagging application). Various additional/alternative mechanisms for semi-automatic tag creation may be implemented by tagging process 10 and/or tagging application 20. For example, a type-ahead prompting, wherein tagging process 10 and/or tagging application 20 may suggest a tag as the user begins typing. The suggested tag may be based upon, at least in part, a match between a possible tag (e.g., based upon suggested tags, popular tags, previously entered tags, and the like) and characters typed by the user. The list of possible tags may be narrowed as the user continues to type additional characters, with fewer possible tags matching the additional typed characters.

User 46 may select, via onscreen pointer 152, one or more tags from suggested tags list 162 and/or from popular tags list 164. For example, user 46 may select the tag "collaboration" from suggested tags list 162 and may select the tag "social" from popular tags list 164 may result in tagging process 10 and/or tagging application 20 creating 100 the tags "collaboration" and "social" associated with web page 150. Additionally, tagging process 10 may associate 102 a semi-automatic tag creation method with each of the tags "collaboration" and "social" as a creation context.

Figure 6:
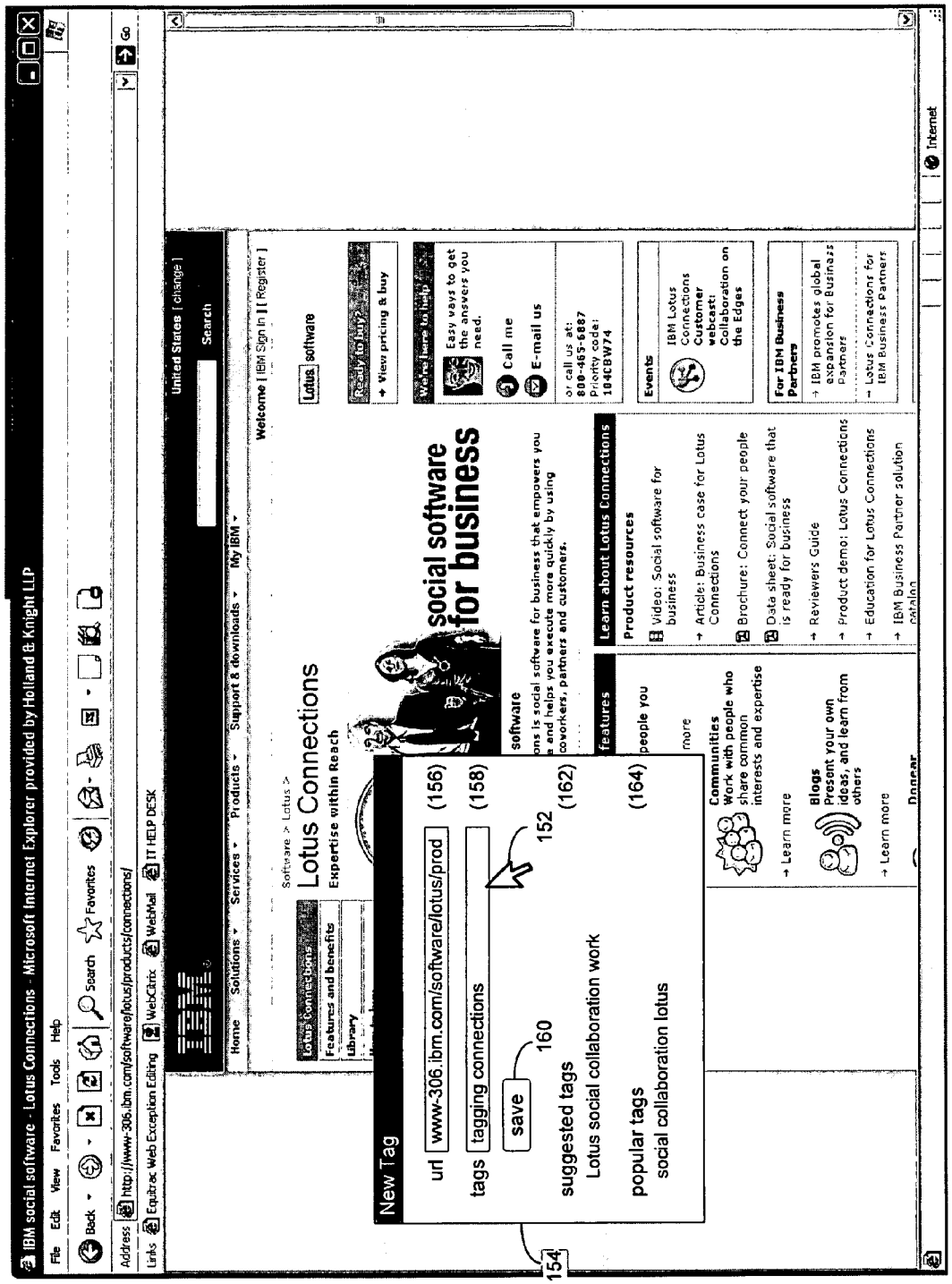
FIG. 6 is a diagrammatic view of a display screen rendered by the client application and/or the tagging process of FIG. 1.

The method used to create the tag may also include a manual tag creation method. For example, tagging process 10 and/or tagging application may not provide automatic and/or semi-automatic tag creation. Further, even if automatic and/or semi-automatic tag creation are provided, a user may prefer to create 100 a tag considered to be more useful, accurate, or the like, as compared to the automatic and/or semi-automatic tags. For example, and referring also to FIG. 6, tagging process 10 and/or tagging application 20 may allow user 46 to manually create a tag. User 46 may select, via onscreen pointer 152, tag field 158, and may input (e.g., via a keyboard; not shown) "tagging" and "connections" into tag field 158. User 46 may select, via onscreen pointer 152, save button 160, resulting in tagging process 10 and/or tagging application 20 creating 100 the tags "tagging" and "connections"

associated with web page 150. Additionally, tagging process 10 may associate 102 a manual tag creation method with each of the tags "tagging" and "connections" as a creation context.

Creating 100 one or more tags associated with a respective piece of content may include storing the created 100 one or more tags along with the piece of content with which the tag is associated. Alternatively, the one or more tags may be stored in a tag repository (e.g., tag database 64, residing on server computer 12). Storing the one or more tags in tag database 64 may allow tags associated with a variety of content, and/or content from a variety of locations (e.g., different web sites, document libraries, and the like) to be commonly stored. As such, tagging process 10 and/or tagging application 20 may also allow a user to search 104 the one or more tags based upon, at least in part, the creation context of the one or more tags. Searching the tags residing in tag database 64 may allow the user to locate a variety of content related (based upon, at least in part, the one or more tags) to a given search query.

Figure 7:
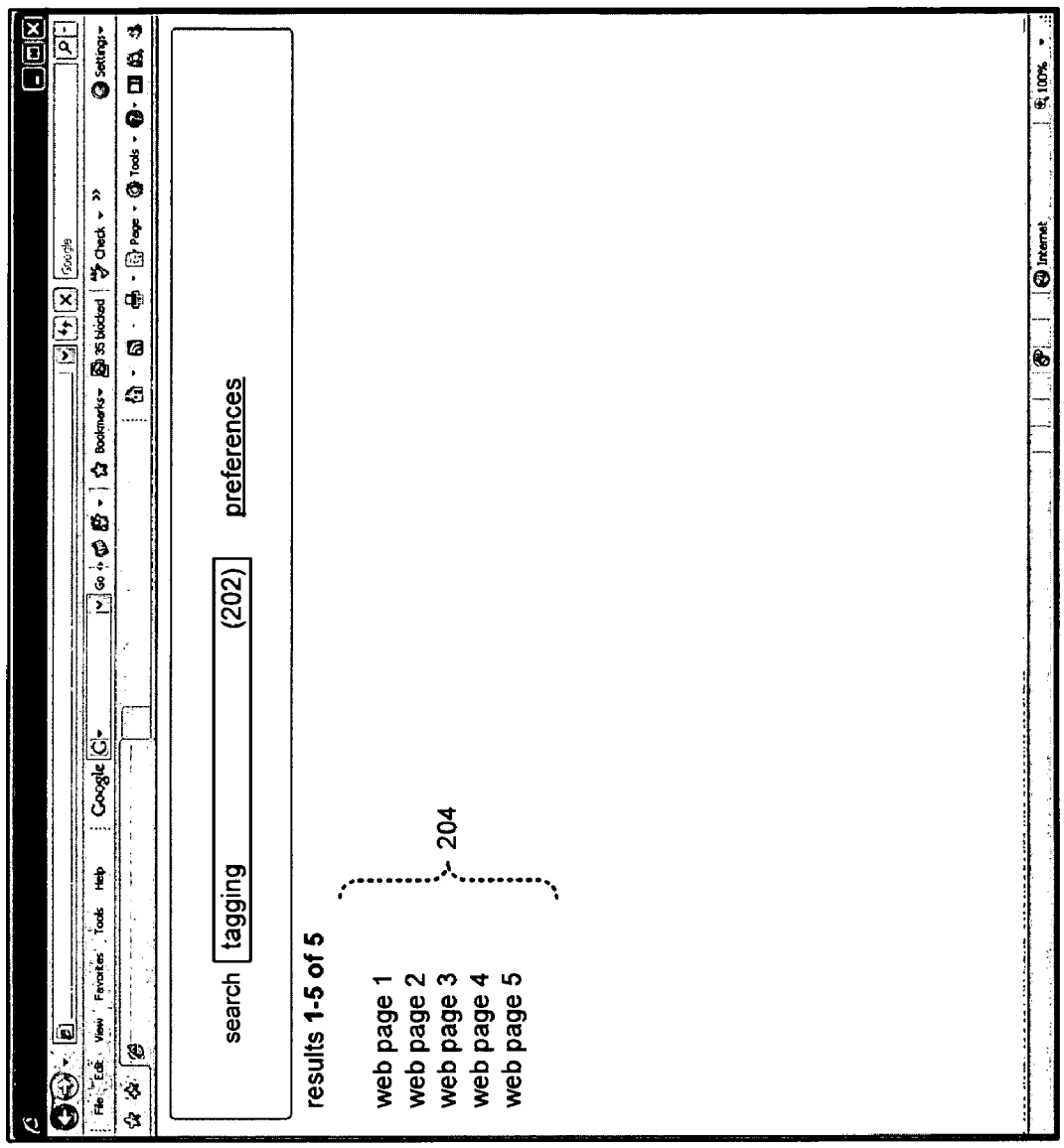
FIG. 7 is a diagrammatic view of a search display screen rendered by the client application and/or the tagging process of FIG. 1.

Continuing with the above stated example, tag database 64 may include a plurality of tags, with each of the tags being associated with a respective piece of content (e.g., the tag may include a pointer, such as a URL to the content, or may be otherwise tied to the respective pieces of content). Referring also to FIG. 7, tagging process 10, tagging application 20, and/or client application 22 may render search display screen 200. Tagging process 10 and/or tagging application 20 may allow user 46 to search 104 the tags (e.g., via keyword "tagging" input in search field 202, for content related to tagging, tagging systems, and the like) residing in tag database 64 based upon, at least in part, the creation context that may be associated 102 with each of the tags. Searching 104 the tags residing in tag database 64 may return result set 204 for the search including one or more tags (e.g., which may include hyperlinks to the content with which the one or more tags are respectively associated), and/or may return a result set for the search including the pieces of content and/or a link to the content with which the one or more tags are respectively associated.

Searching the one or more tags may include defining 106 a weighting factor for each of a plurality of creation contexts. The creation context associated 102 with each of the one or more tags may be leveraged to provide a tailored result set of a search. For example, a given user may view automatically created tags to be generally unreliable because they may be based upon text analysis, embedded metadata, or the like, rather than a subjective evaluation of the associated piece of content. Similarly, the user may view semi-automatically created tags to be slightly more reliable than automatically generated tags because semi-automatically generated tags may be based upon, at least in part, a subjective evaluation of the piece of content. Along these lines, the user may consider manually created tags to be the most reliable because the manually created tags may be based upon a purely subjective evaluation by the tag creator.

Figure 8:
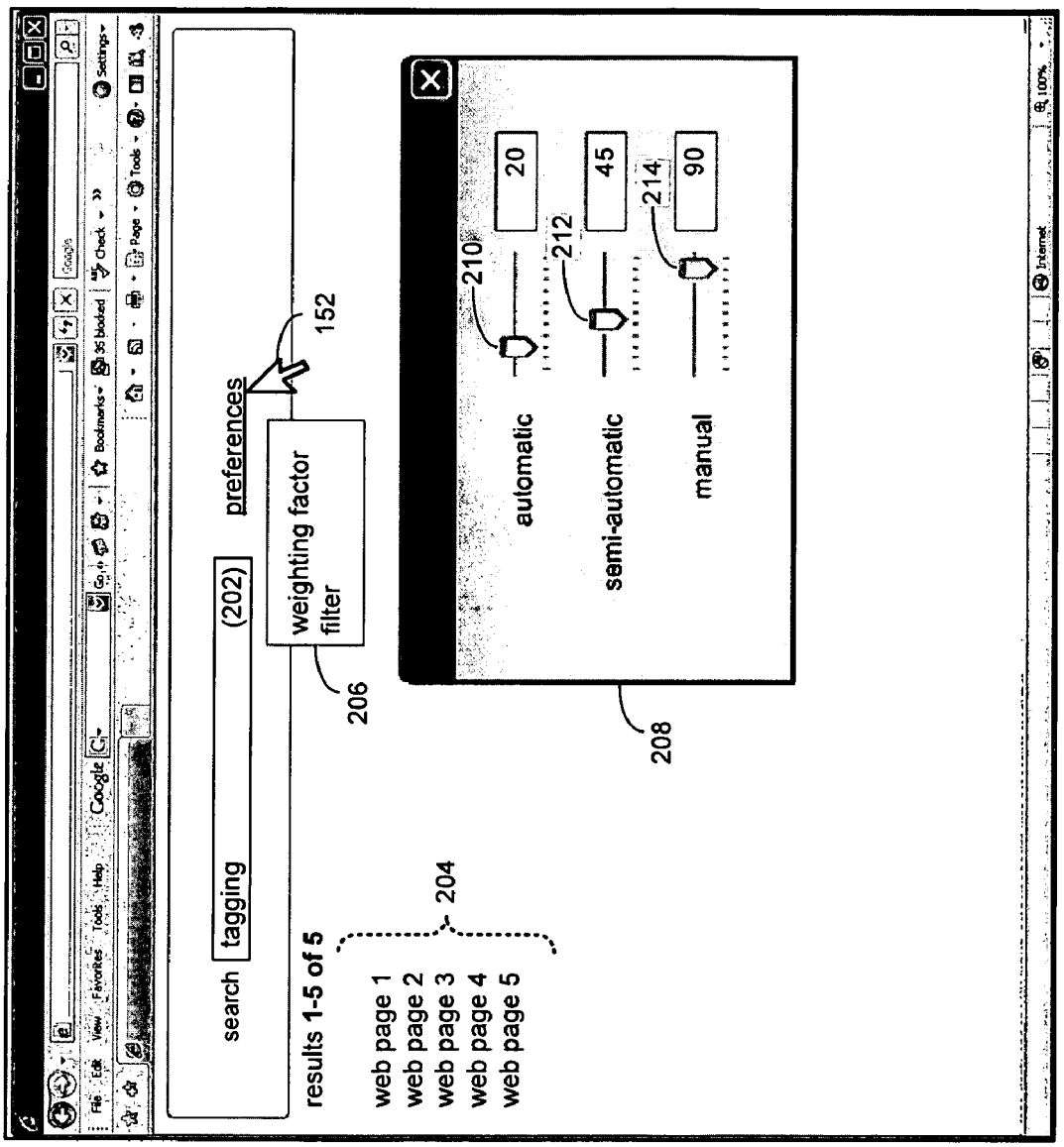
FIG. 8 is a diagrammatic view of a search display screen rendered by the client application and/or the tagging process of FIG. 1.

The weighting factor defined 106 for each of a plurality of creation contexts used to search 104 the one or more tags may be established, e.g., by an administrator and/or as part of the design criteria for tagging process 10. Additionally/alternatively, tagging process 10 and/or tagging application 20 may allow a user to define 106 the weighting factor for each of the plurality of creation contexts. For example, and referring also to FIG. 8, in search display screen 200 user 46 may select, via onscreen pointer 152, the "preferences" option. Selecting the "preferences" option may result in tagging process 10, tagging application 20, and/or client application 22 rendering preferences menu 206. Preference menu 206 may include two options, namely "weighting factor" and "filter". While preferences menu 206 is shown only including two options, this is merely for illustrative purposes as preferences menu 206 may include various additional and/or alternative options according to design criteria and user need.

User 46 may select, via onscreen pointer 152, "weighting factor" from preferences menu 206, resulting in tagging process 10, tagging application 20, and/or client application 22 rendering weighting menu 208. Tagging process 10 and/or tagging application 20 may allow user 46 to define the relative weighting factors for automatically created tags, semi-automatically created tags, and manually created tags, e.g., by adjusting, via onscreen pointer 152, sliders 210, 212, 214, respectively.

Figure 9:
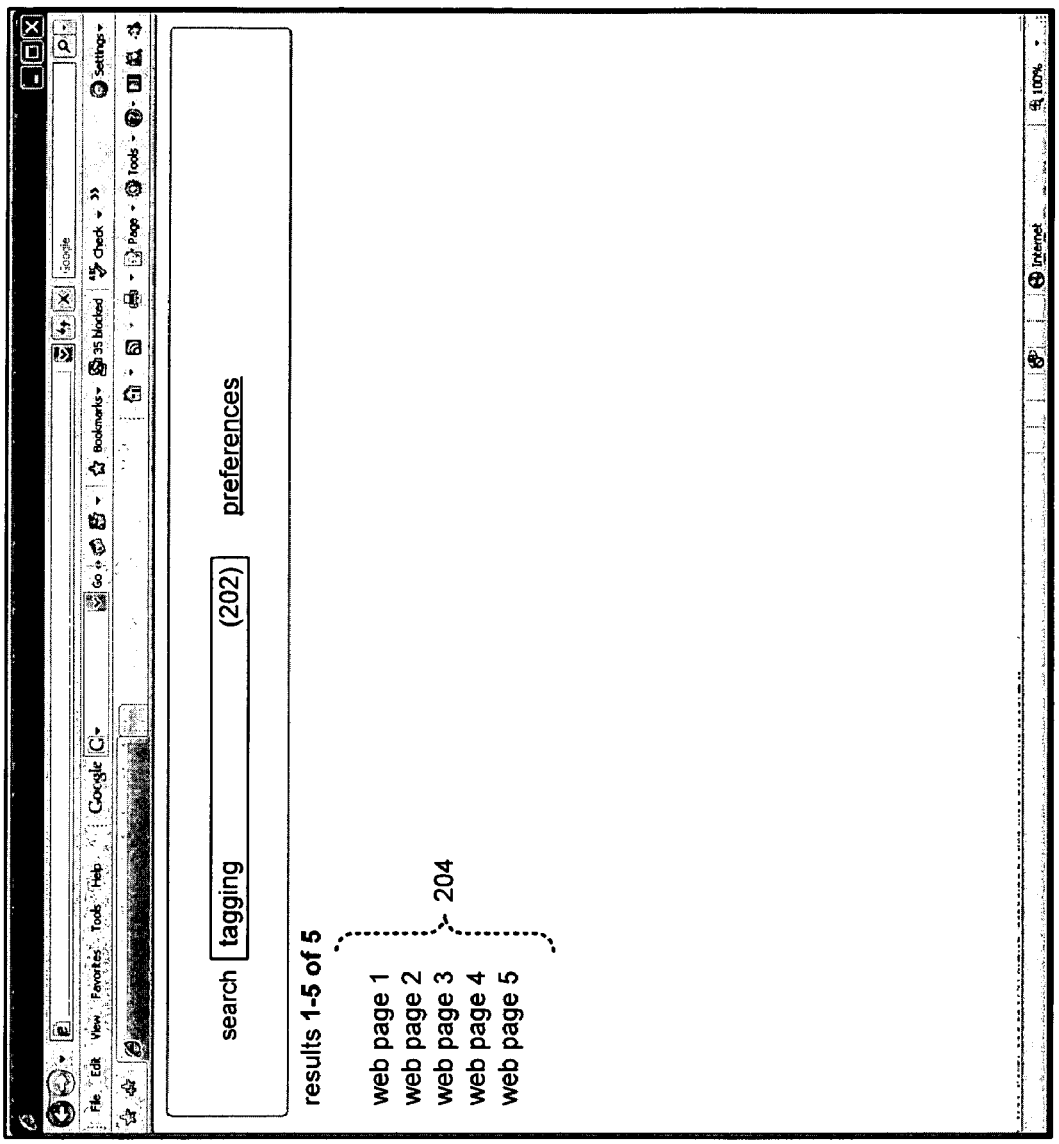
FIG. 9 is a diagrammatic view of a search display screen rendered by the client application and/or the tagging process of FIG. 1.

Searching 104 the one or more tags based upon, at least in part, the associated 102 creation context may include prioritizing 108 a result set of the search based upon, at least in part, the defined 106 weighting factors. Continuing with the above-stated example, and referring also to FIG. 9, result set 204 of the search may be displayed such that the one or more tags (and/or pieces of content with which the one or more tags are associated) are prioritized based upon, at least in part, relevance to the search criteria "tagging" and prioritized 108 based upon, at least in part, the defined 106 weighting factor associated with the creation context of the tag. For example, "web page 1", "web page 2", "web page 3", "web page 4" and "web page 5" of result set 204 may all be equally relevant to the search term "tagging". The tag associated with "web page 1" and with "web page 2" may be manually created 100 tags. Further, the tag associated with "web page 3" and with "web page 4" may be semi-automatically created 100 tags. Additionally, the tag associated with "web page 5" may be an automatically created 100 tag. Accordingly, the one or more tags (and/or the content with which the one or more tags are respectively associated) may be prioritized 108 based upon, at least in part, the defined 106 weighting factor. As such, the content associated with a manually created tag may be displayed first in the results set of the search. The content associated with a semi-automatically created tag may be displayed after content associated with a manually created tag in the results set of the search. Correspondingly, content associated with an automatically created tag may be displayed last in the result set of the search.

Figure 10:
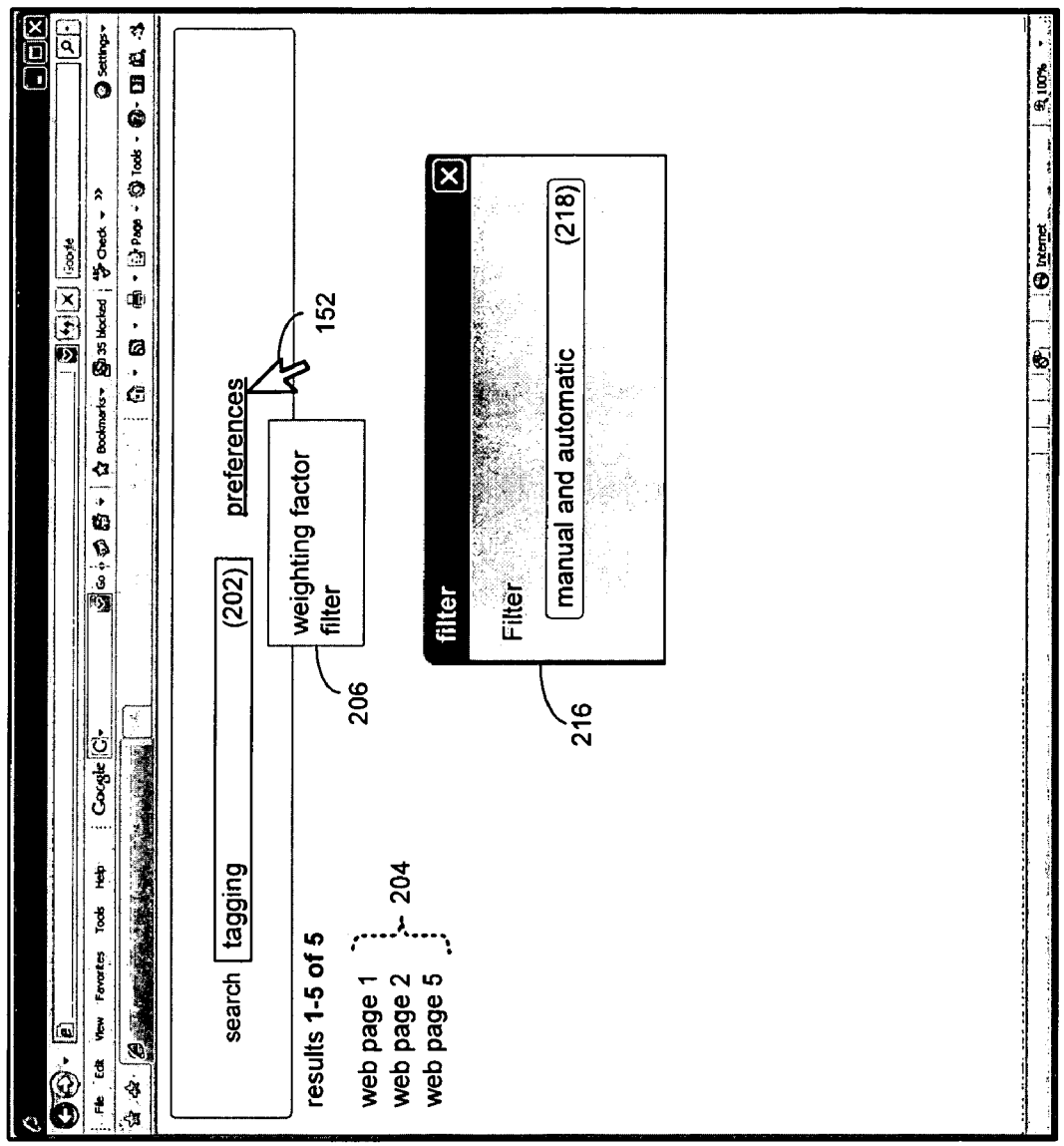
FIG. 10 is a diagrammatic view of a search display screen rendered by the client application and/or the tagging process of FIG. 1.

Additionally/alternatively, searching 104 the one or more tags may include filtering 110 a result set of a search based upon, at least in part, the creation context. For example, and referring also to FIG. 10, user 46 may select "filter" in preferences menu 206, resulting in tagging process 10, tagging application 20, and/or client application 22 rendering filter menu 216. Tagging process 10 and/or tagging application 20 may allow user 40 to input (e.g., via keyboard, not shown; check boxes, etc.) one or more creation contexts associated 102 with the one or more tag for filtering a result set of a search. Continuing with the above-stated example, user 46 may input "manual and automatic" in filter field 218, utilizing Boolean connectors to specify filter criteria to return a result set including tags having an associated 102 creation context of manual tag creation method and tags having an associated 102 automatic tag creation method. Tagging process 10 and/or tagging application 20 may return result set 204 including "web page 1" and "web page 2" having an associated manually created tag and "web page 5" having an associated automatically created tag.

A number of implementations have been described. Nevertheless, it will be understood that various modifications may be made. Accordingly, other implementations are within the scope of the following claims.

What is claimed is:

1. A method comprising:

creating one or more tags, each of the one or more tags associated with a respective piece of content;

associating a creation context with each of the one or more tags, the creation context including a computing environment used to create the one or more tags, the computing environment including an application through which the one or more tags was created, wherein the application through which the one or more tags was created includes at least one of a web browser, an email application, a collaboration application, and a document library application, and wherein the application through which the one or more tags was created provides contextual information about the piece of content with which the tag is associated; and searching the one or more tags for a keyword, and searching the one or more tags based upon, at least in part, the creation context, wherein searching the one or more tags includes search criteria defining a plurality of relative weighting factors for each of a plurality of creation contexts, the plurality of creation contexts including a plurality of methods used to create the one or more tags, the plurality of methods including at least one of automatic tag creation, semi-automatic tag creation, and manual tag creation.

2. The method of claim 1, wherein the creation context includes a method used to create the one or more tags.

3. The method of claim 2, wherein the method used to create the one or more tags includes at least one of automatic tag creation, semi-automatic tag creation, and manual tag creation.

4. The method of claim 1, wherein defining a weighting factor for each of a plurality of creation contexts includes defining a weighting factor by a user.

5. The method of claim 1, wherein searching the one or more tags includes prioritizing a result set of a search based upon, at least in part, the weighting factor.

6. The method of claim 1, wherein searching the one or more tags includes filtering a result set of a search based upon, at least in part, the creation context.

7. The method of claim 1, wherein the contextual information is a suggestion that the piece of content associated with the one or more tags is at least one of a web page, an email item, and a calendar item, the suggestion based upon, at least in part, the application through which the one or more tags was created.

8. The method of claim 1, wherein the computing environment used to create the one or more tags further includes a computing device upon which the one or more tags was created, and wherein contextual information about the piece of content with which the one or more tags is associated is derived from the computing device.

9. The method of claim 1, wherein the application through which the one or more tags was created is a web browser and wherein the web browser suggests that the piece of content associated with the one or more tags is a web page.

10. The method of claim 1, wherein the application through which the one or more tags was created is an email application, and wherein the email application suggests that the piece of content associated with the one or more tags is at least one of an email or a calendar item.

11. A computer program product residing on a computer readable medium having a plurality of instructions stored thereon which, when executed by a processor, cause the processor to perform operations comprising:

creating one or more tags, each of the one or more tags associated with a respective piece of content;

associating a creation context with each of the one or more tags, the creation context including a computing environment used to create the one or more tags, the computing environment including an application through which the one or more tags was created, wherein the application through which the one or more tags was created includes at least one of a web browser, an email application, a collaboration application, and a document library application, and wherein the application through which the one or more tags was created provides contextual information about the piece of content with which the tag is associated; and searching the one or more tags for a keyword, and searching the one or more tags based upon, at least in part, the creation context, wherein searching the one or more tags includes search criteria defining a plurality of relative weighting factors for each of a plurality of creation contexts, the plurality of creation contexts including a plurality of methods used to create the one or more tags, the plurality of methods including at least one of automatic tag creation, semi-automatic tag creation, and manual tag creation.

12. The computer program product of claim 11, wherein the creation context includes a method used to create the one or more tags.

13. The computer program product of claim 12, wherein the method used to create the one or more tags includes at least one of automatic tag creation, semi-automatic tag creation, and manual tag creation.

14. The computer program product of claim 11, wherein the instructions for defining a weighting factor for each of a plurality of creation contexts include instructions for defining a weighting factor by a user.

15. The computer program product of claim 11, wherein the instructions for searching the one or more tags include instructions for prioritizing a result set of a search based upon, at least in part, the weighting factor.

16. The computer program product of claim 11, wherein the instructions for searching the one or more tags include instructions for filtering a result set of a search based upon, at least in part, the creation context.

17. The computer program product of claim 11, wherein the contextual information is a suggestion that the piece of content associated with the one or more tags is at least one of a web page, an email item, and a calendar item, the suggestion based upon, at least in part, the application through which the one or more tags was created.

18. The computer program product of claim 11, wherein the computing environment used to create the one or more tags further includes a computing device upon which the one or more tags was created, and wherein contextual information about the piece of content with which the one or more tags is associated is derived from the computing device.

19. The computer program product of claim 11, wherein the application through which the one or more tags was created is a web browser and wherein the web browser suggests that the piece of content associated with the one or more tags is a web page.

20. The computer program product of claim 11, wherein the application through which the one or more tags was created is an email application, and wherein the email application suggests that the piece of content associated with the one or more tags is at least one of an email or a calendar item.

* * * * *